No. 806,433. PATENTED DEC. 5, 1905.
J. SCANNELL.
CARRIAGE WHEEL JOINT SUPPORT.
APPLICATION FILED MAY 8, 1905.

Witnesses:
C. R. Lambdin
T. C. Gaddis

Inventor:
John Scannell

UNITED STATES PATENT OFFICE.

JOHN SCANNELL, OF HELENA, MONTANA.

CARRIAGE-WHEEL-JOINT SUPPORT.

No. 806,433.     Specification of Letters Patent.     Patented Dec. 5, 1905.

Application filed May 8, 1905. Serial No. 259,452.

*To all whom it may concern:*

Be it known that I, JOHN SCANNELL, a citizen of the United States, residing at the city of Helena, in the county of Lewis and Clarke and State of Montana, have invented certain new and useful Improvements in Vehicle-Wheel-Joint Supports, of which the following is a specification.

The present invention has reference to that class of vehicle-wheel-joint supports embodied in my patent dated July 7, 1903, No. 732,899, and is designed as an improvement thereon whereby the construction materially simplifies the casting of the device in addition to obtaining increased effectiveness and greater strength, as well as practicability, as will be hereinafter described and subsequently pointed out in the claims.

Figure 1:
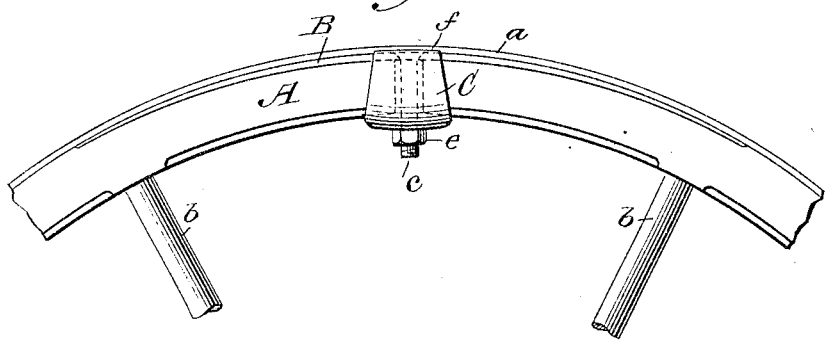
Figure 2:
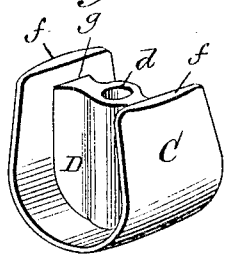
Figure 3:
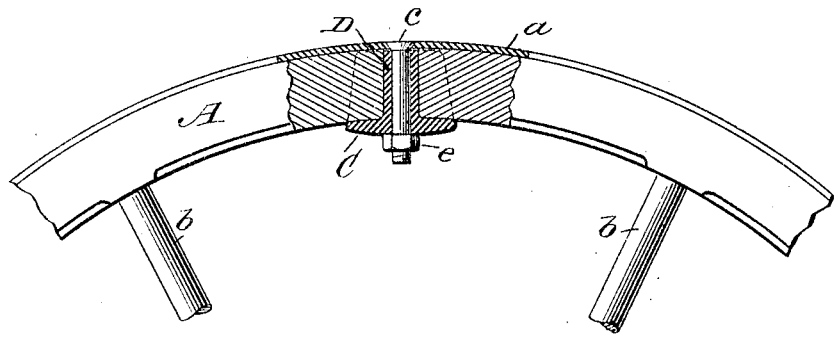

Figure 1 of the drawings is a side elevation of a portion of the rim of a vehicle-wheel showing my improvement applied thereto; Fig. 2, a detail perspective view of the felly-plate and web integral therewith; Fig. 3, a side elevation, partly in section, of a portion of a rim of a vehicle with the spring-plate between the rim and tire shown in Fig. 1 omitted.

In the accompanying drawings, A represents a portion of a rim of a vehicle-wheel having the usual tire *a* and spokes *b*.

Instead of having the spring-plate, web, and the bolt formed integral, as in my former patent, the spring-plate, as indicated at B, is formed separate, with a countersunk hole to receive the head of a fastening-bolt *c*, and the felly-plate C and the web D are cast integral, as shown in Fig. 2 of the drawings, thereby facilitating the casting of the same and rendering it of greater strength and durability and with increased effectiveness. The bolt *c* passes through the spring-plate B and extends through a perforation or hole *d* in the web D and through the bottom of the felly-plate, and a nut *e* engages the screw-threaded end of the bolt to draw the felly-plate up against the rim of the wheel, the ends of the felly being clamped by the felly-plate and forced against the spring-plate or tire by tightening the nut upon the end of the bolt and forcing it up against the under side of the felly-plate. The sides of the felly-plate C extend on a plane above the plane of the web D, as indicated at *f*, so as to embrace and abut against the spring-plate B, the extension of the sides of the felly-plate being omitted when the spring-plate is not used, as the felly-plate with web may be used simply as a joint for new wheels. The web D of the felly-plate C is dovetailed at the junctures between said plate and web, as shown at *g*, which is considered of material importance when the felly-plate is used to repair sagged joints of wheels.

Every provision is made for a perfect and practical device for strengthening the rims of vehicle-wheels and providing means that can be successfully used on old and worn wheels, as well as on new wheels, in providing a simple and strong joint therefor.

It is preferred that the spring-plate interposed between the rim and tire of the wheel gradually decrease in thickness in a direction toward its ends, as in my former patent, to increase its effectiveness and enable the tire of the wheel to better fit over the plate and rim of the wheel.

Having now fully described my invention, what I claim as new, and desire to secure by Letters Patent, is—

1. A felly-plate for vehicle-wheels and a perforated transverse web integral therewith, said web being dovetailed at its juncture between the sides of the plate and web, substantially as and for the purpose set forth.

2. A felly-plate and a transverse perforated web integral therewith, a spring-plate and means for fastening the felly-plate and spring-plate to the rim of the vehicle-wheel, substantially as and for the purpose described.

3. In a vehicle-wheel, a felly-plate and transverse perforated web integral therewith, a spring-plate disposed between the rim and tire of the wheel, a bolt extending through the spring-plate and the perforation of the web, and a nut engaging the bolt to draw the felly-plate against the rim of the wheel and against the spring-plate, substantially as and for the purpose specified.

4. A felly-plate and perforated transverse web integral therewith, said web being dovetailed at its juncture between the sides of the plate and web and the sides of the plate extending on a plane above the plane of the web, substantially as and for the purpose set forth.

5. In a vehicle-wheel, a felly-plate having a transverse perforated web integral therewith and formed dovetailed at its juncture between the sides of the plate and web, the sides of the plate extending on a plane above the plane of the web, and a spring-plate interposed between the rim and tire of the wheel, and means for securing the felly-plate to said rim, substantially as and for the purpose specified.

In testimony whereof I have signed my name to this specification, in the presence of two subscribing witnesses, this 16th day of March, A. D. 1905.

JOHN SCANNELL.

Witnesses:
H. F. SHEEHAN,
R. A. WILSON.